(12) United States Patent
Watari et al.

(10) Patent No.: US 8,392,851 B2
(45) Date of Patent: Mar. 5, 2013

(54) IMAGE PROCESSING APPARATUS

(75) Inventors: Takahiko Watari, Nagoya (JP); Keiichi Matsunaga, Seto (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1286 days.

(21) Appl. No.: 12/163,465

(22) Filed: Jun. 27, 2008

(65) Prior Publication Data

US 2008/0259054 A1    Oct. 23, 2008

(30) Foreign Application Priority Data

Jun. 28, 2007    (JP) ................................ P2007-171253

(51) Int. Cl.
    *G06F 3/043*    (2006.01)
(52) U.S. Cl. ...................................... 715/838; 345/177
(58) Field of Classification Search .................. 715/838; 345/177
    See application file for complete search history.

(56) References Cited

U.S. PATENT DOCUMENTS

| | | | |
|---|---|---|---|
| 5,963,204 A * | 10/1999 | Ikeda et al. ................... | 715/723 |
| 6,453,078 B2 | 9/2002 | Bubie et al. | |
| 6,701,011 B1 | 3/2004 | Nakajima | |
| 6,750,890 B1 * | 6/2004 | Sugimoto ..................... | 715/838 |
| 7,570,839 B1 | 8/2009 | Mages | |
| 2002/0033959 A1 | 3/2002 | Ando et al. | |
| 2003/0194117 A1 | 10/2003 | Okuzawa | |
| 2004/0160630 A1 | 8/2004 | Iriyama et al. | |
| 2006/0181750 A1 | 8/2006 | Lu et al. | |
| 2007/0136208 A1 | 6/2007 | Hamashima et al. | |
| 2008/0252593 A1 * | 10/2008 | Fukuta .......................... | 345/156 |
| 2008/0316518 A1 | 12/2008 | Watari et al. | |

FOREIGN PATENT DOCUMENTS

| | | |
|---|---|---|
| CN | 101330558 A | 12/2008 |
| JP | 2000-215322 | 8/2000 |
| JP | 2003-305027 A | 10/2003 |
| JP | 2004-056641 A | 2/2004 |
| JP | 2004-56782 | 2/2004 |
| JP | 2004-070912 A | 3/2004 |
| JP | 2005-096301 A | 4/2005 |
| JP | 2006-067235 A | 3/2006 |
| JP | 2009-003689 A | 1/2009 |

OTHER PUBLICATIONS

Patent Office of the People's Republic of China, Decision on Rejection for Chinese Patent Application No. 200810129558.4, issued Mar. 3, 2011.

Japan Patent Office, Office Action for Japanese Patent Application No. 2007-171253, mailed Aug. 23, 2011.

* cited by examiner

*Primary Examiner* — Tadeese Hailu
*Assistant Examiner* — Darrin Hope
(74) *Attorney, Agent, or Firm* — Baker Botts L.L.P.

(57) ABSTRACT

An image processing apparatus includes a thumbnail display control unit, a process display control unit, and a changing unit. The thumbnail display control unit controls a thumbnail image representing a content of the image data to display on the touch panel. The process display control unit controls process-indicating images corresponding to a plurality of candidate processes to be performed on the image data to display on the touch panel together with the thumbnail image. The changing unit changes a designated thumbnail image to a processed thumbnail image that represents a result of the designated process performed on the image data corresponding to the designated thumbnail image designated while maintaining to display the thumbnail image other than the designated thumbnail image designated each time the process designating unit designates the process.

10 Claims, 10 Drawing Sheets

| IMAGE FILE | ATTRIBUTE INFORMATION |
|---|---|
| P1 | SEPIA, RIGHT-HANDED ROTATION |
| P2 | SEPIA, RIGHT-HANDED ROTATION, RED EYE CORRECTION |
| P3 | SEPIA, RIGHT-HANDED ROTATION, RED EYE CORRECTION |
| ⋮ | ⋮ |

IMAGE PROCESSING APPARATUS

CROSS REFERENCE TO RELATED APPLICATION

This application claims priority from Japanese Patent Application No. 2007-171253 filed Jun. 28, 2007. The entire content of this priority application is incorporated herein by reference.

TECHNICAL FIELD

The present invention relates to an image processing apparatus and an image processing method. More particularly, the invention relates to an image processing apparatus and an image processing method that can be easy to operate and enables the user to understand clearly the influence of the image process that the user has selected on images.

BACKGROUND

Image processing apparatuses which can perform various image processes, such as hue correction and image rotation, on the image data acquired by electronic cameras are well known in the art. In such an image processing apparatus, thumbnail images (i.e., reduced images) are arranged on the display screen. The user can therefore see a list of input image-data.

Japanese Patent Application Publication No. 2000-215322 discloses the technique of preparing various macros that can be used to perform prescribed image processes. That is, the process program is edited by combining any macros selected from prepared macros. Thus, the edited program is performed on the thumbnail images that should be processed. This technique can perform various types of image processes altogether.

SUMMARY

The technique disclosed in the above-identified publication is indeed useful if the user has previously selected to determine what image processes to be performed. In most cases, however, the user determines what processes to be performed, while making trials and errors. Hence, with the conventional techniques, including that one disclosed in the above-identified publication, the user cannot help but repeat various actions such as switching the thumbnail images to a screen selected, selecting any thumbnail image to be processed, switching the screen to one for selecting an image process, and selecting the image process to be performed. This is a troublesome work for the user to do.

The user may consider uniformity images, that is, the user may often perform the same process on photographs taken, for example, at the same place. In such a case, the user first performs the process on a few of such photograph images, then examines the effect achieved by the process, determining whether the effect achieved is satisfactory, and finally perform the process on the other photograph images if the effect is satisfactory.

With the technique disclosed in the above-identified publication, which displays only the thumbnail images already processed, the user cannot visually confirm the influence that the process he or she has selected may impose on images.

The present invention has been made in view of the foregoing. An object of this invention is to provide an image processing apparatus and an image processing method that can be easy to operate and enables the user to understand clearly the influence of the image process that the user has selected on images.

In order to attain the above and other objects, the invention provides an image processing apparatus. The image processing apparatus includes a touch panel, a retrieving unit, a thumbnail display control unit, a determining unit, a thumbnail designating unit, a process display control unit, a process designating unit, and a changing unit. The touch panel detects an indicated position thereon. The retrieving unit retrieves image data. The thumbnail display control unit controls a thumbnail image representing a content of the image data to display on the touch panel. The determining unit determines whether an indicated position detected by the touch panel corresponds to an image displayed on the touch panel. The thumbnail designating unit designates the thumbnail image based on a determination made by the determining unit. The process display control unit controls process-indicating images corresponding to a plurality of candidate processes to be performed on the image data to display on the touch panel together with the thumbnail image. The process designating unit designates a process from among the plurality of candidate processes based on a determination made by the determining unit. The changing unit changes a thumbnail image designated by the thumbnail designating unit to a processed thumbnail image that represents a result of the designated process performed on the image data corresponding to the thumbnail image designated by the thumbnail designating unit while maintaining to display the thumbnail image other than the thumbnail image designated by the thumbnail designating unit each time the process designating unit designates the process.

According to another aspects, the invention provides an image processing method. The image processing method includes a) detecting an indicated position on a touch panel, b) retrieving image data, c) controlling a thumbnail image representing a content of the image data to display on the touch panel, d) determining whether an indicated position corresponds to an image displayed on the touch panel, e) designating the thumbnail image based on a determination made by the determining, f) controlling process-indicating images corresponding to a plurality of candidate processes to be performed on the image data to display on the touch panel together with the thumbnail image, g) designating a process from among the plurality of candidate processes based on a determination made by the determining, and h) changing a thumbnail image designated in the designating step e) to a processed thumbnail image that represents a result of the designated process performed on the image data corresponding to the thumbnail image designated in the designating step e) while maintaining to display the thumbnail image other than the thumbnail image designated in the designating step e) each time the designating the process.

BRIEF DESCRIPTION OF THE DRAWINGS

Embodiments in accordance with the invention will be described in detail with reference to the following figures wherein:

FIG. 3(*a*) is a diagram showing a screen of a touch panel displaying thumbnail images;

FIG. 3(*b*) is a diagram schematically showing a configuration of a position information storage area;

DETAILED DESCRIPTION

Figure 1:
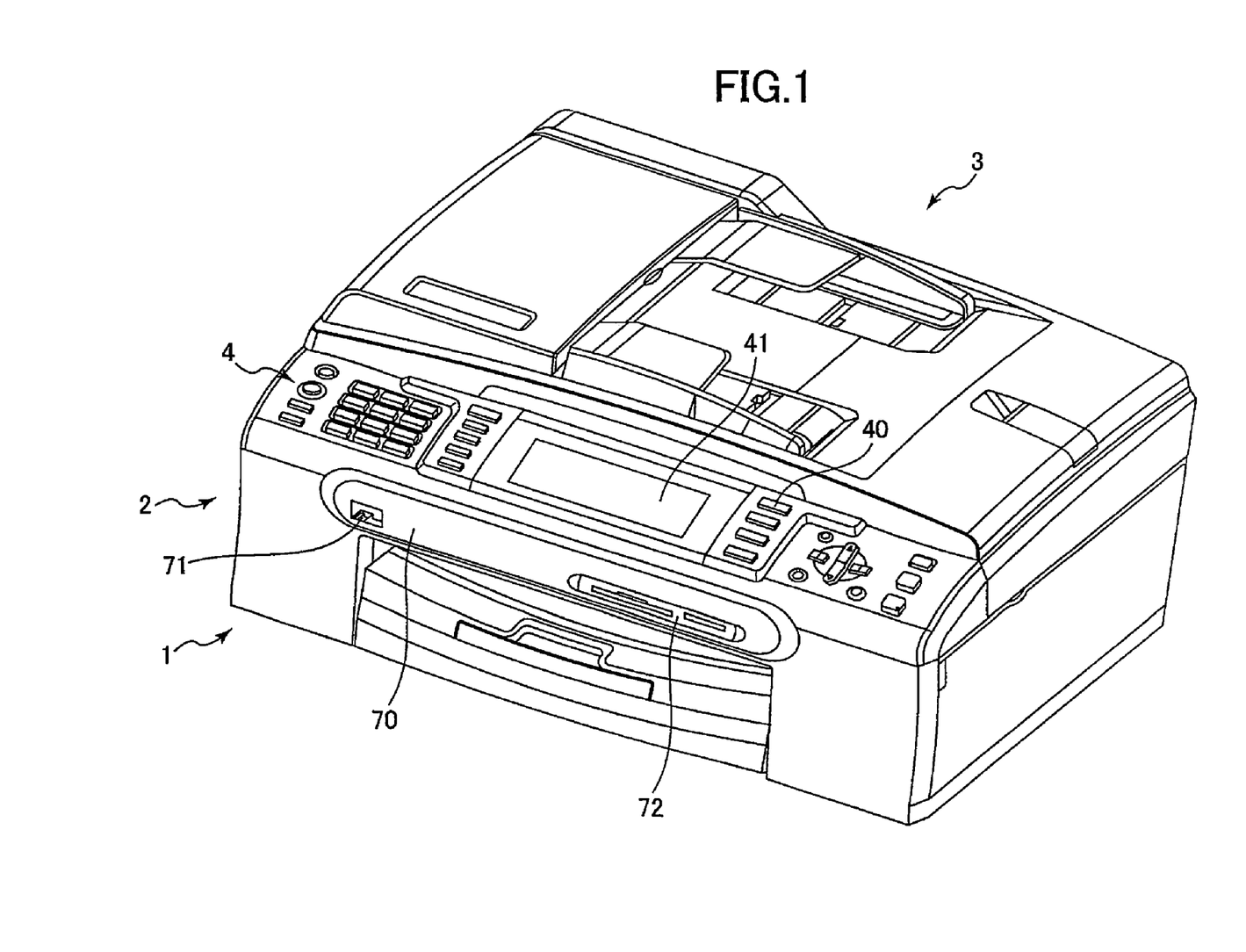
FIG. 1 is a perspective view showing the outer appearance of a multifunction peripheral according to an embodiment.

An embodiment of the invention will be described with reference to the accompanying drawings. FIG. 1 is a perspective view showing the outer appearance of a multifunction peripheral (MFP) 1 according to the invention. As shown in FIG. 1, the multifunction peripheral 1 has a printer 2, a scanner 3 and an operation panel 4 that are formed integral with each other. The printer 2 is provided on the lower section of the multifunction peripheral 1, the scanner 3 is provided on the upper section of the multifunction peripheral 1 and the operation panel 4 is provided on the front of the scanner 3. The multifunction peripheral 1 can perform various functions, such as copier function, facsimile function and printer function. While set to printer mode, the multifunction peripheral 1 can receive data from an external apparatus (not shown) such as a personal computer (hereinafter referred to as PC) and can record (print) the data on a recording sheet.

The multifunction peripheral 1 has a connection panel 70. The connection panel 70 has a USB terminal 71 on the left end thereof. The USB terminal 71 is a connector terminal. Once connected to the external apparatus, the USB terminal 71 enables the multifunction peripheral 1 to communicate with the external apparatus. The connection panel 70 has a slot portion 72 on the right end thereof. The slot portion 72 has a plurality of card slots, into which memory cards (card-shaped memories) can be inserted. Once a memory card has been inserted in any card slot, a control unit 20 (see FIG. 2), which will be described later, reads an image file (i.e., an image data) from the memory card.

The operation panel 4 is provided on the front of the multifunction peripheral 1. The operation panel 4 is rectangular, extending in the widthwise direction of the multifunction peripheral 1. The operation panel 4 is configured to operate the printer 2 and the scanner 3. The operation panel 4 has various operation keys 40 and a touch panel 41. The user can operate the operation panel 4 in order to input desirable commands. When prescribed commands are input to the multifunction peripheral 1, the control unit 20 (see FIG. 2) controls some of the other components of the multifunction peripheral 1, in accordance with the input command.

The touch panel 41 has a screen on which images can be displayed. The touch panel 41 inputs information corresponding to a contact position or a proximity position of a pointer. Thus, the user can input a desirable instruction by contacting (touching) the screen with the pointer, such as, a finger or a pen.

Figure 2:
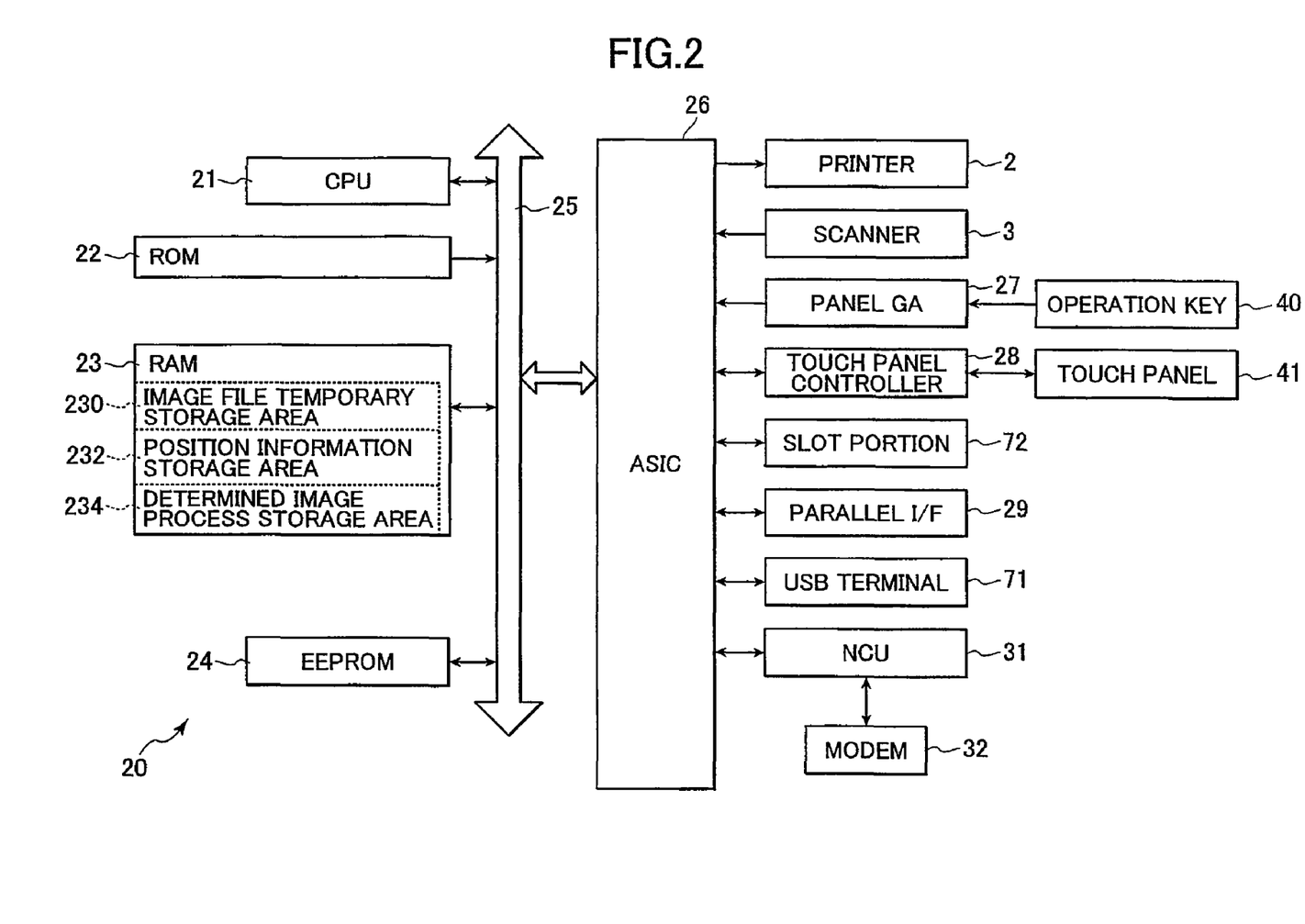
FIG. 2 is a block diagram showing an electrical configuration of the multifunction peripheral.

The electrical configuration of the multifunction peripheral 1 according to the embodiment will be described, with reference to FIG. 2. FIG. 2 is a block diagram representing the electrical configuration of the multifunction peripheral 1. The multifunction peripheral 1 has a parallel interface 29, a USB terminal 71, and a slot portion 72. The parallel interface (I/F) 29 can be connected by a cable to an external apparatus such as a PC. The USB terminal 71 can be connected to, for example, a digital camera. The slot portion 72 can hold removable external media (e.g., a memory card and a hard disk). Hence, image files can be input to the multifunction peripheral 1 from PCs, digital cameras, external media. The manner of connecting the multifunction peripheral 1 to the external media is not limited to this. The multifunction peripheral 1 may be connected to the external media via a network I/F (not shown).

The control unit 20 totally controls components of the multifunction peripheral 1, including the printer 2, scanner 3 and operation panel 4. The control unit 20 is a microcomputer that includes mainly a central processing unit (CPU) 21, a read only memory (ROM) 22, a random access memory (RAM) 23, and an electrically erasable and programmable ROM (EEPROM) 24. A bus 25 connects the control unit 20 to an application specific integrated circuit (ASIC) 26.

The CPU 21 is the central processing unit that totally controls the multifunction peripheral 1. The ROM 22 stores various control programs the CPU 21 executes (e.g., the program represented by the flowchart of FIG. 4(b)) and stores fixed values the CPU 21 uses to execute the control programs.

The RAM 23 is a rewritable memory that is used as a storage area or working area for temporarily storing various data the CPU 21 uses to execute the above-mentioned programs. The RAM 23 has a load area into which a program is read when the multifunction peripheral 1 is activated.

The RAM 23 has an image file temporary storage area 230, a position information storage area 232, and a determined image process storage area 234.

The image file temporary storage area 230 is an area in which the image files read from a memory card are stored when the memory card (not shown) is inserted into the slot portion 72. In the embodiment, the image files that can be stored in the image file temporary storage area 230 is, for example, image data item of JPEG system. Thumbnail data is added to each image file, for representing the image file as a reduced image.

Figure 3A:
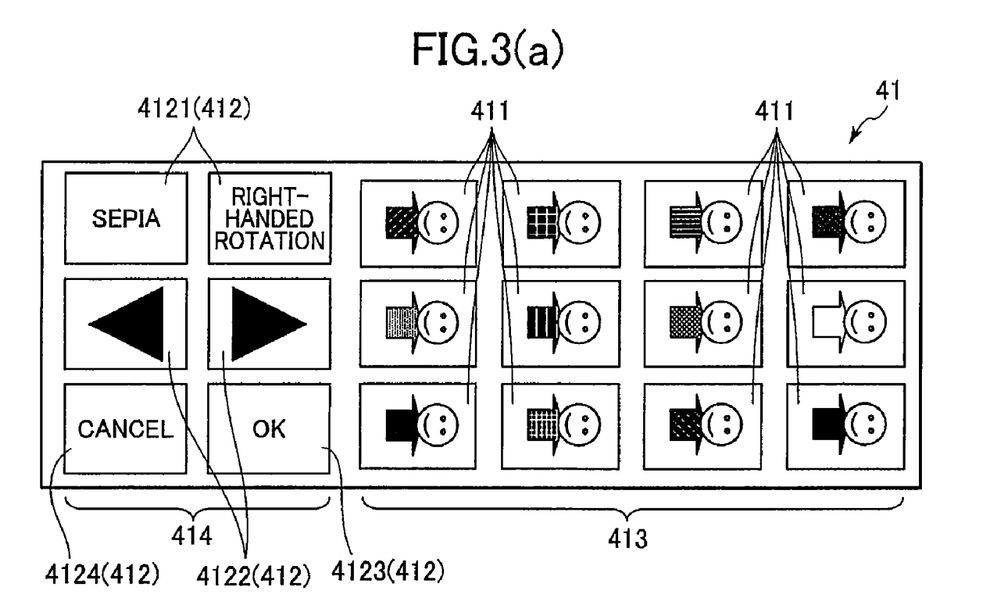

A thumbnail image 411 will be explained with reference to FIG. 3(a). FIG. 3(a) is a diagram showing a screen of the touch panel 41 displaying thumbnail images 411. The thumbnail image 411 is displayed on the touch panel 41 based on the thumbnail data added to an image file. As shown in FIG. 3(a), the thumbnail images 411 are reduced sample images that represent the contents of the image files read into the image file temporary storage area 230. The touch panel 41 can display the thumbnail images 411 in the form of a matrix pattern.

In the embodiment, a display region of the touch panel 41 is divided into a thumbnail display region 413 and an operation-key display region 414. Thumbnail images 411 are displayed in the thumbnail display region 413, and the various operation-key images 412 are displayed in the operation-key display region 414. The operation-key images 412 include image-process keys 4121, cursor keys 4122, an OK key 4123, and a cancel key 4124. As shown in FIG. 3(*a*), in the embodiment, 12 thumbnail images 411 are displayed in four columns and three rows in the thumbnail display region 413.

The image-process keys 4121 are button-like images presenting, to the user, various image processes that can be performed on each image file. The user can touch a image-process key 4121 to select the image process that should be performed on the image file. One image-process key 4121 indicates one image process. The image processes the multi-function peripheral 1 can perform include: right-handed rotation (i.e., rotating the image clockwise), left-handed rotation (i.e., rotating the image counterclockwise), sepia (i.e., changing the image to a sepia-tone one), image-numbering, (i.e., assigning ordering numbers to images), margin-elimination (i.e., imparting no margins to the image), red eye correction (i.e., changing the red eye image to a normal one), monochrome imaging (i.e., changing the color image to a monochromatic one), date-recording (i.e., adding the photographing date to the image), margin-setting (i.e., setting margins to the image), and exposure correction (i.e., adjusting the brightness of the image).

If the multifunction peripheral 1 can perform many image processes, the touch panel 41 may be designed to display, at a time, many image-process keys 4121 associated with these image processes. In the embodiment, as shown in FIG. 3(*a*), the touch panel 41 displays, for example, two image-process keys 4121 at a time. When a cursor key 4122 is touched, the image-process key 4121 currently displayed on the screen will change to an image-process key other than the image-process key 4121 currently displayed on the screen of the touch panel 41.

In this way, the limited display region of the touch panel 41 is efficiently used, displaying many image-process keys 4121 to the user. The functions assigned to the OK key 4123 and cancel key 4124 will be described later, with reference to FIG. 4(*b*).

With reference to FIG. 2 again, the RAM 23 will be described. The position information storage area 232 is for storing a correspondence relation between the image that is displayed on the touch panel 41 and information that represents the positions of the images corresponding to the image data that is displayed on the touch panel 41.

Figure 3B:
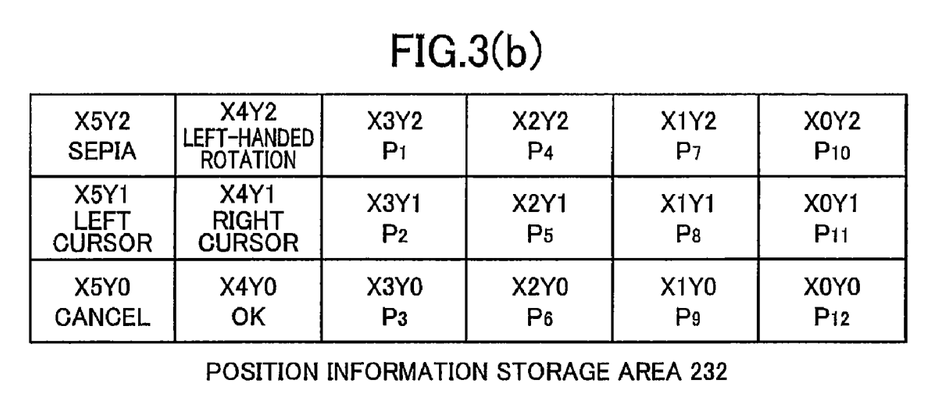

FIG. 3(*b*) is a diagram schematically showing the configuration of the position information storage area 232. More precisely, FIG. 3(*b*) illustrates the position information stored in the position information storage area 232 while the touch panel 41 is displaying the image shown in FIG. 3(*a*). As shown in FIG. 3(*b*), the position information storage area 232 is a storage area for storing the correspondence relation between the data representing the image being displayed on the touch panel 41 and the position information that represents the position of the image being displayed.

The position information stored in the position information storage area 232 is coordinate data representing the x-coordinate and y-coordinate of a point on the touch panel 41 in a coordinate system in which an origin is defined as a lower-right corner of the touch panel 41. In FIG. 3(*b*), any coordinate is denoted as XiYj, where Xi is the x-coordinate value and Yj is the y-coordinate value (here, i and j are natural number). When the user touches any image shown on the touch panel 41 with a pointer 42 as shown in FIG. 6(*b*), the touch panel 41 detects a contact (or proximities) of the pointer 41 by pressure. Accordingly, the data representing the coordinates of the position where the pointer 42 touches the image is input.

When the touch panel 41 is displaying thumbnail images 411 and operation-key images 412 as shown in FIG. 3(*b*), the image-file names ($P_1$, $P_2$, . . . ) of the thumbnail images 411 displayed at each coordinate or the functions of the operation-key images 412 is stored in the position information storage area 232, in association with the respective coordinates.

Hence, any thumbnail image 411 or any image process the user has touched (selected) on the touch panel 41 can be determined from the coordinates of the touch point, which are input from the touch panel 41.

As shown in FIG. 3(*b*), image-file name P1, for example, is associated with the rectangular region identified with coordinates X3Y2. Thus, coordinates X3Y2 is input to the CPU 21 from the touch panel 41 if the user touches the thumbnail image 411 displayed at coordinates X3Y2. Based on the input from the touch panel 41, the CPU 21 determines (detects) that the image file P1 is touched.

Referring back to FIG. 2, the RAM 23 will be further described. The determined image process storage area 234 is an area for storing information (attribute information) representing the processes that are determined to be performed on the image data files stored in the image file temporary storage area 230.

Figure 4A:
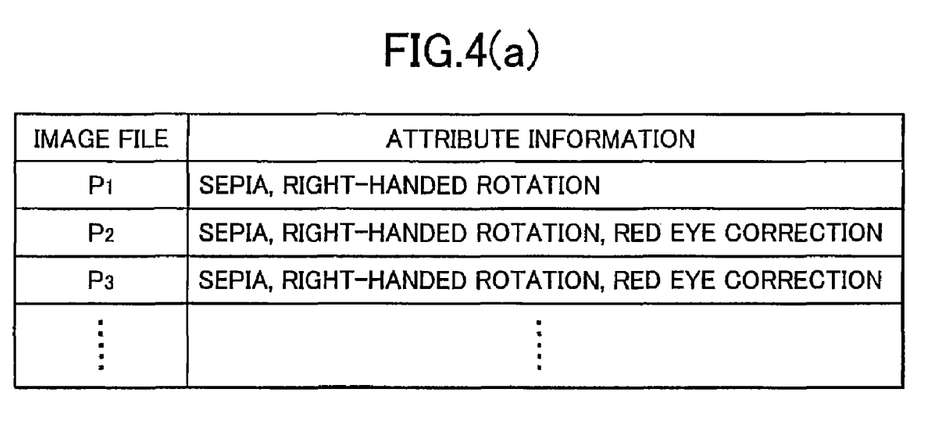
FIG. 4(a) is a diagram schematically showing a configuration of a determined image process storage area.
Figure 4B:
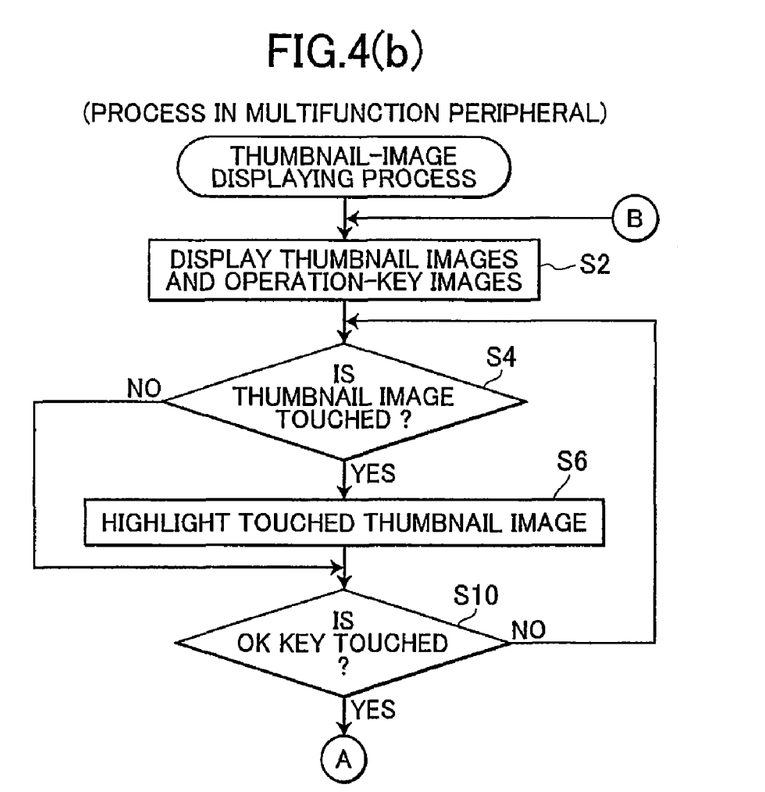
FIG. 4(b) is a flowchart explaining a part of a thumbnail-image displaying process performed by the multifunction peripheral.

FIG. 4(*a*) is a diagram schematically representing the configuration of the determined image process storage area 234. When the user designates (determines) any process to be performed on an image file, the designated (determined) process is stored in the determined image process storage area 234 as attribute information about the image file.

With reference to FIG. 2 again, the ASIC 26 connected will be described. The ASIC 26 is connected to the control unit 20 by the bus 25. The ASIC 26 is connected to the panel gate array (panel GA) 27. The panel gate array 27 controls the operation keys 40, which the user may operate to input desirable commands in the multifunction peripheral 1. The panel gate array 27 detects the depression of any operation key 40 operated (i.e., a command input) and outputs a prescribed code signal. On receiving the prescribed key code from the panel gate array 27, the CPU 21 performs a control in accordance with a prescribed key-processing table (not shown) associated with the key code.

The ASIC 26 is connected to a touch-panel controller 28 for controlling the touch panel 41. In accordance with a command supplied from the CPU 21, the touch-panel controller 28 causes the touch panel 41 to display the image represented by the data received, to the multifunction peripheral 1, from the external apparatus connected or from the memory card inserted in the slot portion 72.

The ASIC 26 is also connected to a modem 32 via a network control unit (NCU) 31. The NCU 31 is connected to a public line 33. The multifunction peripheral 1 achieves the facsimile function by using the NCU 31.

Figure 5:
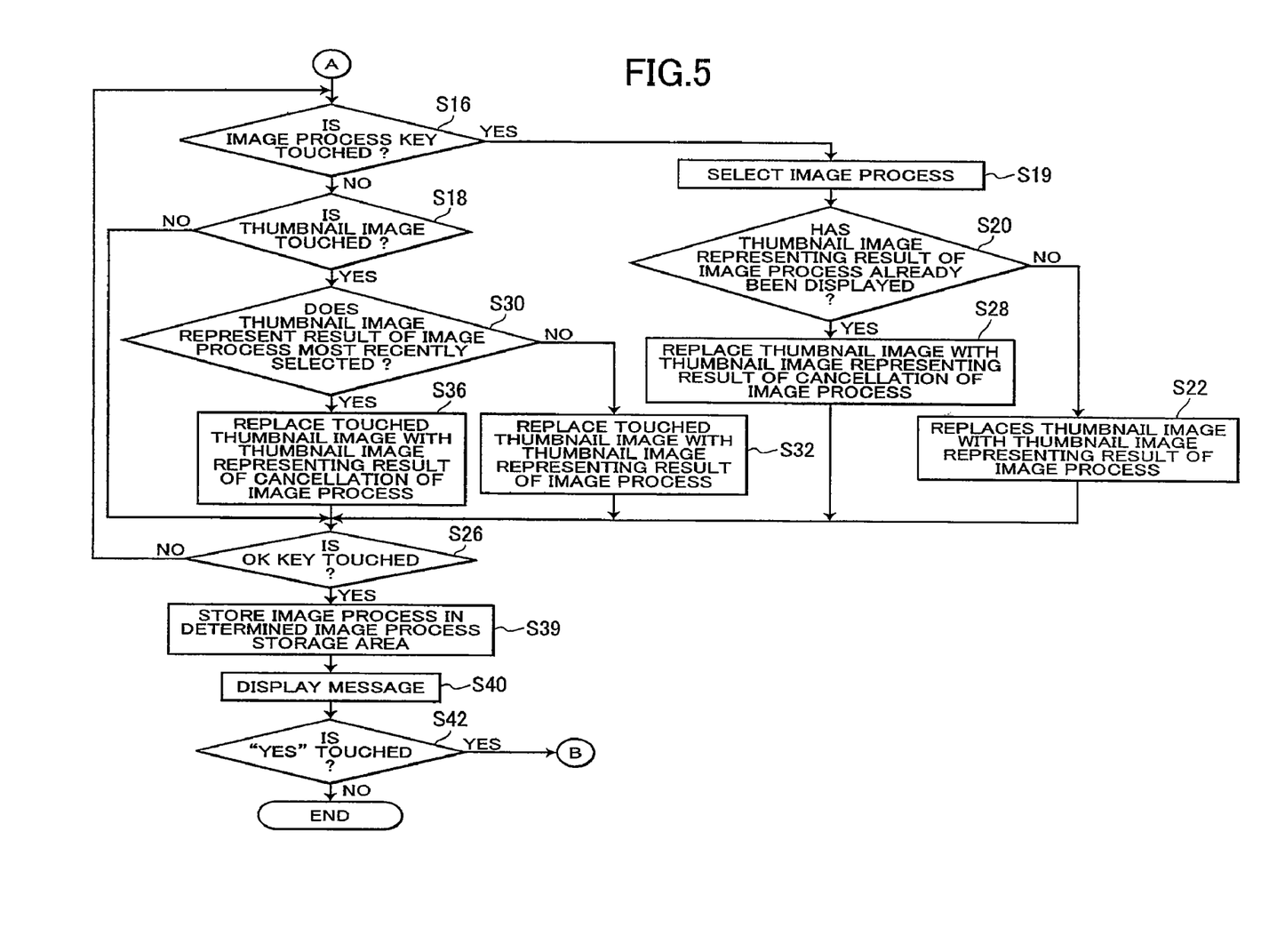
FIG. 5 is a flowchart explaining remaining part of the thumbnail-image displaying process.

The thumbnail-image displaying process performed by the multifunction peripheral 1 described above will be explained with reference to FIG. 4(*b*), FIG. 5, FIG. 6(*a*), FIG. 6(*b*) and FIG. 7(*a*). FIG. 4(*b*) is a flowchart explaining the sequence of steps up to the middle part of the thumbnail-image displaying process performed by the multifunction peripheral 1. FIG. 5 is a flowchart explaining the remaining steps of the thumbnail-image displaying process.

Figure 6A:
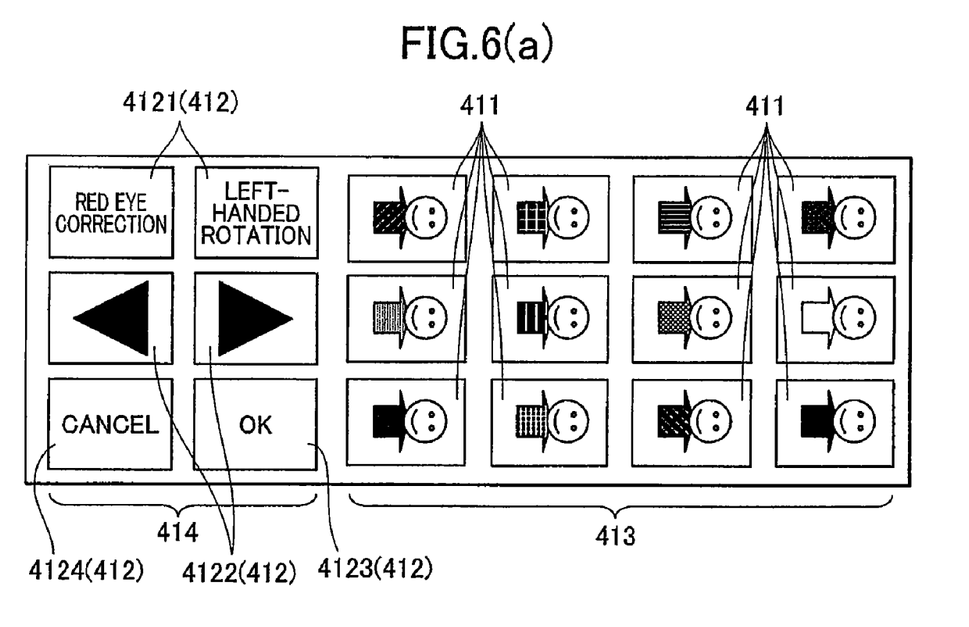
FIG. 6(a) shows a screen of the touch panel displaying operation-key images including thumbnail images and image-process keys.
Figure 6B:
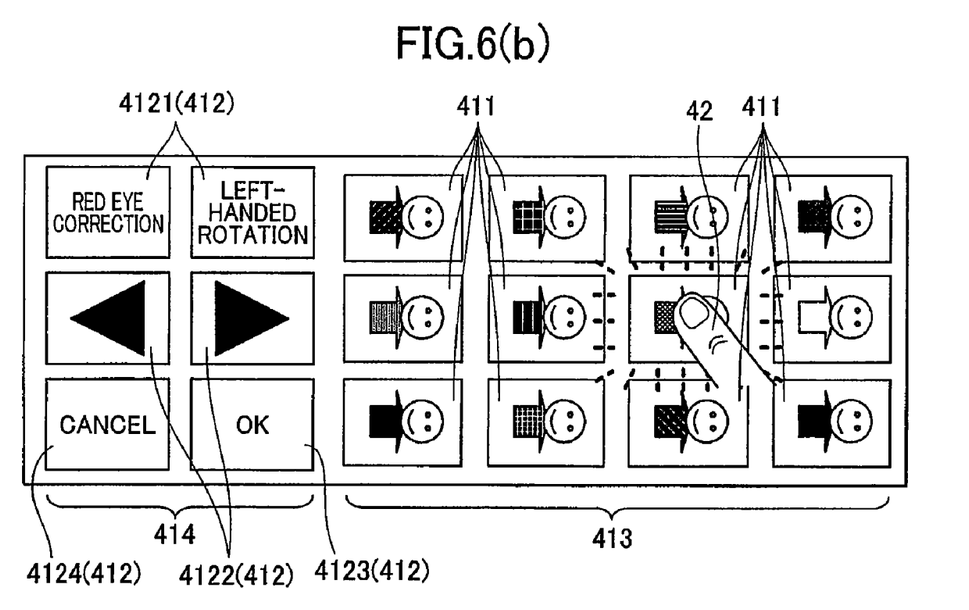
FIG. 6(b) shows a screen of the touch panel on which a touched thumbnail image is highlighted.
Figure 7A:
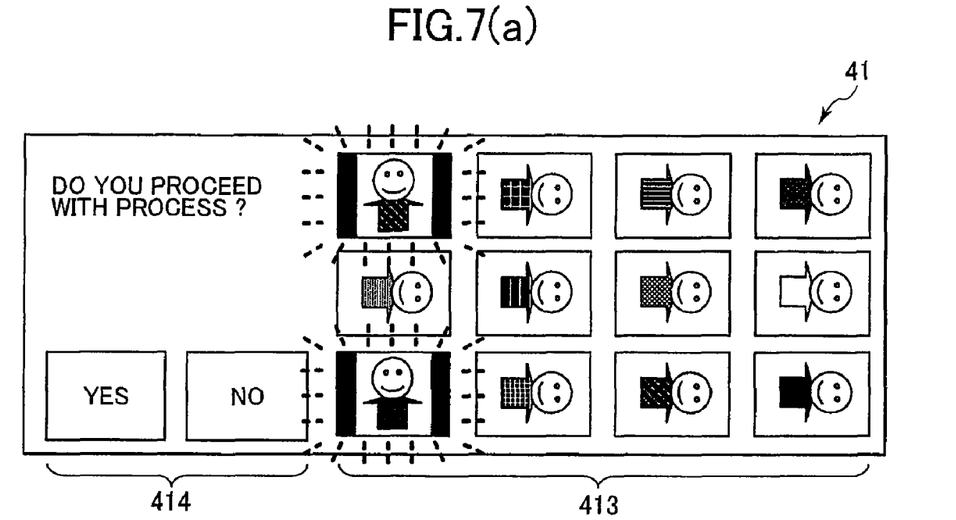
FIG. 7(a) is a diagram showing a screen of the touch panel after the user after selects an image process and touches the OK key.

FIG. 6(a), FIG. 6(b), and FIG. 7(a) illustrate various data items the touch panel 41 may display during the thumbnail-image displaying process. With reference to FIG. 6(a), FIG. 6(b), and FIG. 7(a), the thumbnail-image displaying process (shown in the flowcharts of FIG. 4(b) and FIG. 5) will be explained.

The thumbnail-image displaying process is initiated when the user inserts the memory card into the slot portion 72 and the image file stored in the memory card is read into the image file temporary storage area 230 (see FIG. 2). The thumbnail-image displaying process is terminated when the user touches the cancel key 4124.

In the thumbnail-image displaying process, as shown in FIG. 4(b), in S2 the CPU 21 controls the touch panel 41 to display m thumbnail images 411 in the form of a matrix in the thumbnail display region 413. Here, m is an integer equal to or greater than 2. At the same time, the CPU 21 controls the touch panel 41 to display the various operation-key images 412, including the image-process keys 4121, in the operation-key display region 414. If the number of image processes, which should be displayed as choices, is greater than m, the cursor keys (not shown) may be touched to display the other thumbnail images 411 that cannot be otherwise be displayed. FIG. 6(a) shows a screen of the touch panel in step S2 displaying a group of operation-key images 412 including some thumbnail images 411 and some image-process keys 4121.

With reference to FIG. 4(b) again, the thumbnail-image displaying process will be further explained. In S4 the CPU 21 determines whether any thumbnail image 411 displayed on the touch panel 41 has been touched. More specifically, the CPU 21 determines whether the pointer 42 has touched the touch panel 41 and whether the value of the x-coordinate at the contact position where the pointer 42 has touched the panel 41 falls within the range of 0 to 3. Here, the value of the x-coordinate within the range of 0 to 3 is located in the thumbnail display region 413.

If the CPU 21 determines that the pointer 42 touches any thumbnail image 411 (S4: Yes), in S6 the CPU 21 recognizes the thumbnail image 411 as a selected thumbnail image and controls the touch panel 41 to highlight the selected thumbnail image 411. Hereinafter, thumbnail images 411 not recognized as selected shall be called non-selected thumbnail images. The method of determining whether each thumbnail image is a selected thumbnail image or a non-selected thumbnail image is not limited to a specific one. Various methods can be employed, such as a method using a memory table, and a method using variables.

Next, in S10 the CPU 21 determines whether the OK key 4123 displayed at the coordinates (4, 0) has been touched. If the CPU 21 determines that the OK key 4123 has not been touched (S10: No), the CPU 21 returns to and repeats S4. That is, if the CPU 21 determines that the OK key 4123 has been touched (S4: Yes), the CPU 21 controls the touch panel 41 to highlight the corresponding thumbnail image 411.

Figure 6C:
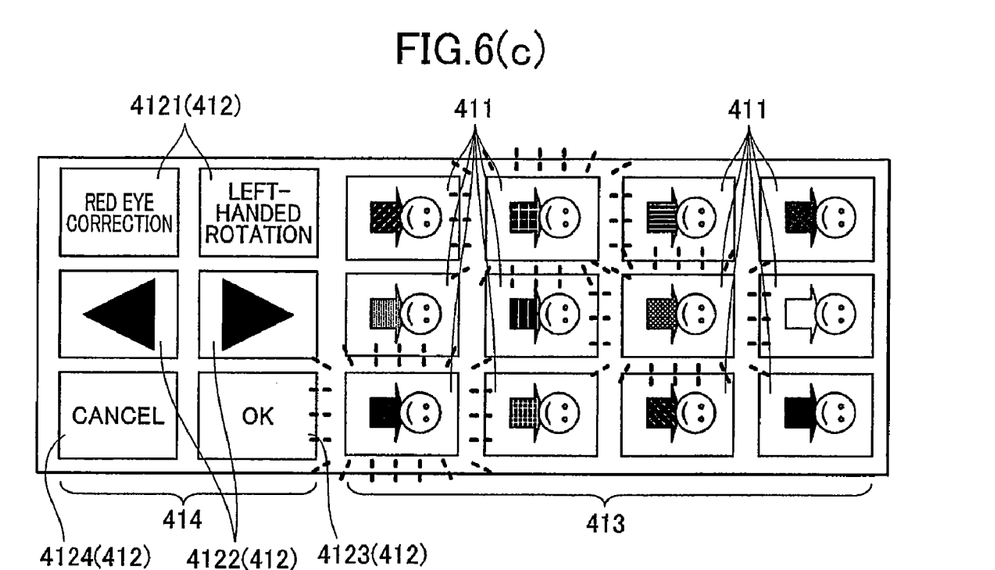
FIG. 6(c) shows a screen of the touch panel on which a plurality of touched thumbnail images are highlighted.

As shown in FIG. 6(b), the thumbnail image 411 that has been touched with the pointer 42 is highlighted. As shown in FIG. 6(c), a plurality of thumbnail images 411 that have been touched with the pointer 42 are highlighted. Hence, the user can know, at a glance, wrong thumbnail images, if any, which he or she has touched by mistake.

With reference to FIG. 4(b) again, the thumbnail-image displaying process will be further explained. When the user finishes electing all thumbnail images 411 that should be selected be repeating S4-S10, he or she touches the OK key 4123. In this case, that is, the CPU 21 determined that the OK key 4123 has been touched (S10: Yes), the CPU 21 proceeds to S16 as shown in FIG. 5.

Figure 6D:
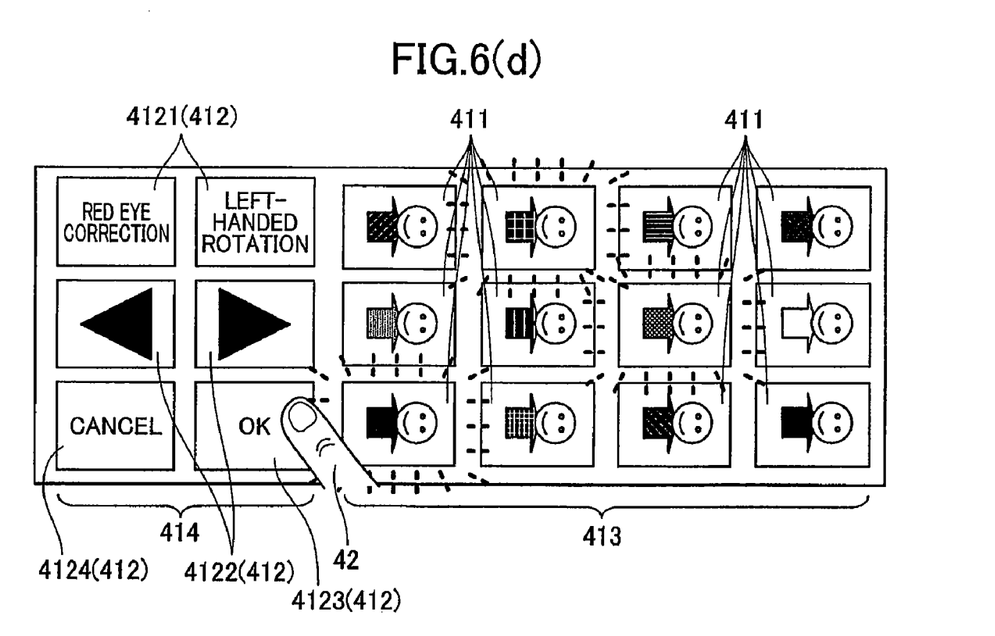
FIG. 6(d) shows a screen of the touch panel when an OK key is touched.
Figure 6E:
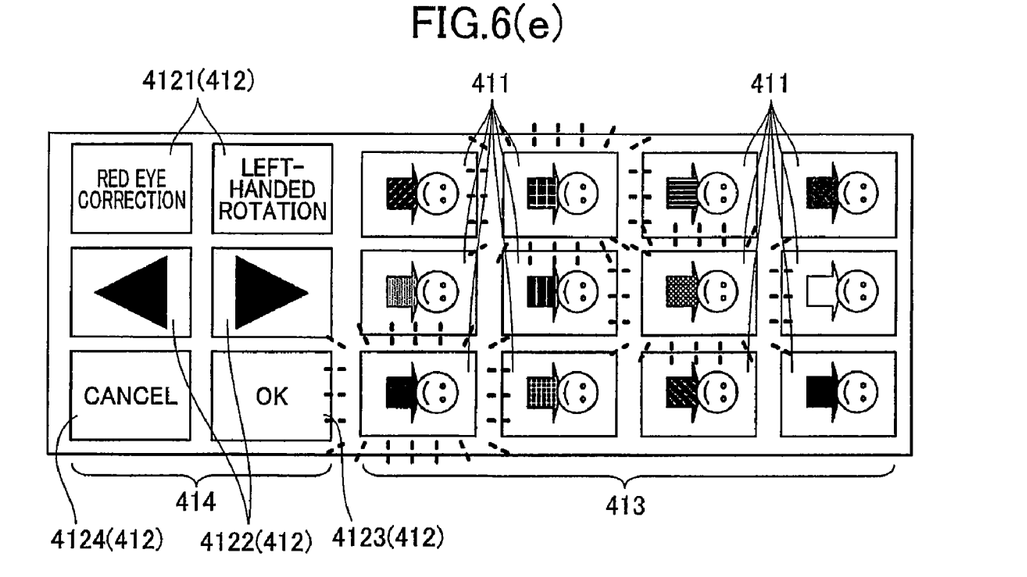
FIG. 6(e) shows a screen of the touch panel after the OK key is touched.

FIG. 6(c), FIG. 6(d) and FIG. 6(e) are diagrams illustrating how all thumbnail images 411 that the user touches until he or she touches the OK key 4123 after the touch panel 41 displays the thumbnail images 411 are highlighted one after another.

FIG. 6(c) shows a screen of the touch panel 41 on which a plurality of touched thumbnail images 411 are highlighted. FIG. 6(d) shows a screen of the touch panel 41 when the OK key 4123 is touched. FIG. 6(e) shows a screen of the touch panel 41 after the OK key 4123 is touched. As shown in FIG. 6(c), FIG. 6(d) and FIG. 6(e), all thumbnail images that the user touches until he or she touches the OK key 4123 are highlighted, that is, displayed in a different manner than the non-selected thumbnail images. This enables the user to understand which thumbnail images are being selected and to select appropriate image processes thereafter.

The thumbnail-image displaying process will be further explained, with reference to the flowchart of FIG. 5. This flowchart abbreviates the process that is performed when the user touches a cursor key 4122. Nonetheless, in the multi-function peripheral 1 according to this embodiment, the touch panel 41 displays different image-process keys 4121, one after another, as the user repeatedly touches the cursor key 4122.

In S16 the CPU 21 determines whether an image-process key 4121 has been touched. If the CPU 21 determines that the image-process key 4121 has been touched (S16: Yes), in S19 the CPU 21 selects an image process corresponding to the image-process key 4121. Then, in S20 the CPU 21 determines whether the thumbnail image 411 representing the result of the selected image process has already been displayed on the touch panel 41.

If the CPU 21 determines that the thumbnail image 411 representing the result of the selected image process is not displayed on the touch panel 41 (S20: No), in S22 the CPU 21 replaces the thumbnail image 411 being displayed with a thumbnail image 411 representing the result of the selected image process performed on the image data corresponding to the selected thumbnail image.

Figure 6F:
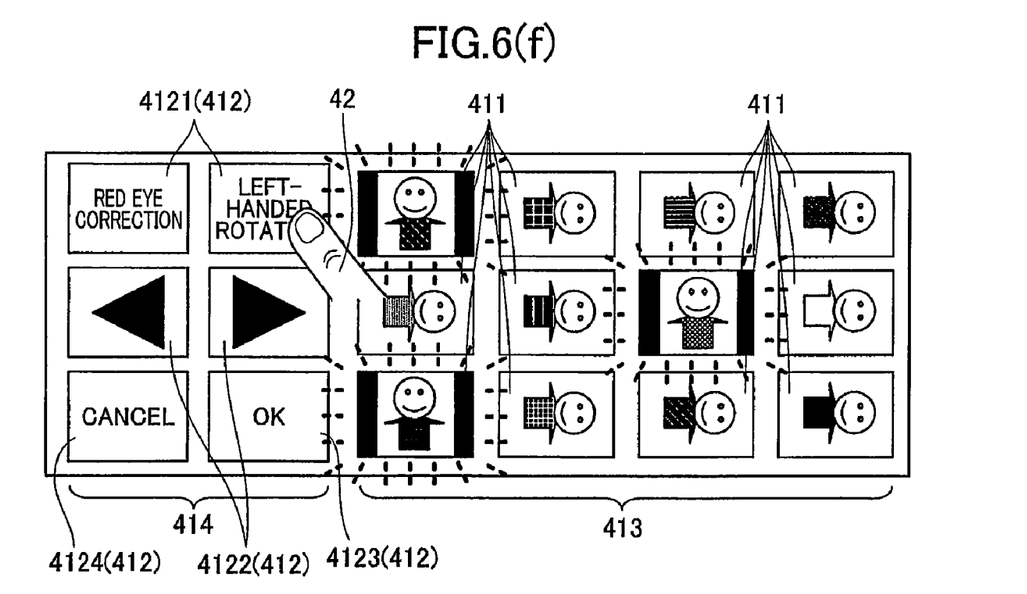
FIG. 6(f) shows a screen of the touch panel when selected thumbnail images is replaced with thumbnail images representing results of the selected image process.

FIG. 6(f) is a diagram showing the thumbnail images 411 when the selected thumbnail images 411 is replaced with thumbnail images 411 representing the results of the selected image process performed on the image data corresponding to the selected thumbnail images 411. As shown in FIG. 6(f), if any image process is selected by the user touching the corresponding image-process key 4121, the selected thumbnail images 411 will be substituted all together by thumbnail images 411 that represent the result of the selected image process performed on the image data corresponding to the selected thumbnail images 411.

In the case shown in FIG. 6(f), the user touches the image-process key 4121 "left-handed rotation", whereby the thumbnail images 411 selected are displayed, each rotated counter-clockwise. Thus, results of the image process that the user selected to the image files can be displayed to the user at a time. Seeing the thumbnail images 411, the user can quickly confirm which image file has undergone which image process.

As shown in FIG. 6(f), any non-selected thumbnail image 411 remains displayed without change. Thus, the user can clearly understand the influence of any image process he or she has selected. That is, the user can understand that "left-handed rotation," for example, imposes on any image files selected, by comparing the selected thumbnail images 411 with the non-selected thumbnail images 411.

In the embodiment, any selected image process is performed on the thumbnail data added to each image file, a thumbnail image (e.g., thumbnail image rotated counterclockwise) is displayed based on the thumbnail data so processed, representing the result of the selected image process. Instead, the selected image process may be performed on the image file (main image data), thumbnail data may be formed from this processed image file thus, and a thumbnail image may be displayed based on the thumbnail data, representing the result of the image process performed on the image file.

Referring to FIG. 5 again, the thumbnail-image displaying process will be further explained. The CPU 21 proceeds from S22 to S26. In S26 the CPU 21 determines whether the OK key 4123 at the coordinates (4, 0) has been touched. If the CPU 21 determines that the OK key 4123 at the coordinates (4, 0) has not been touched (S26: No), the CPU 21 returns to and repeats S16.

If the CPU 21 determines that the touch panel 41 has already displayed the thumbnail image 411 representing the result of the image process selected in S19 (S20: Yes), in S28 the CPU 21 controls the touch panel 41 to replace each touched (selected) thumbnail image 411 representing the result of the selected image process with a thumbnail image 411 representing the result of canceling the selected image process with respect to the image data corresponding to the touched (selected) thumbnail image 411. In other words, in S28 the CPU 21 controls the touch panel 41 to replace each touched (selected) thumbnail image 411 representing the result of the selected image process with a thumbnail image 411 representing the result of the image processes that has been selected in S16 without the image process that is most recently selected in S16, on the image data corresponding to the touched (selected thumbnail image 411). Thus, if only one image process has been selected in S16, the CPU 21 controls the touch panel 41 to replace each touched (selected) thumbnail image 411 with a thumbnail image 411 representing image without performing the selected image process on the image data corresponding to the touched (selected) thumbnail image 411.

For example, as shown in FIG. 6(f), if the left-handed rotation has been previously selected as the image process, each thumbnail image 411 selected has been displayed as an image rotated counterclockwise. In this state, when the left-handed rotation is selected again, the left-handed rotation is thereby cancelled. That is, each selected thumbnail image 411 is replaced with the thumbnail image 411 representing the result of the cancellation of the left-handed rotation with respect to the image data corresponding to the selected thumbnail image 411. In other words, each selected thumbnail image 411, which has been rotated counterclockwise, is substituted by a thumbnail image canceling the counterclockwise rotation. That is, a thumbnail image not rotated at all is displayed, as shown in FIG. 6(e).

That is, if the image-process key 4121 corresponding to the image process, the result of which has already displayed, is touched again, the thumbnail image 411, which represents the result of the image process performed on the image data corresponding to the thumbnail image, is replaced by a thumbnail image, which represents the result of cancellation of that image process with respect to the image data. The user can visually confirm both a thumbnail image representing an image after performing the image process on the image data and a thumbnail image representing before the image process. This enhances the operability of the multifunction peripheral 1.

Next, the CPU 21 proceeds to S26. If the CPU 21 determines that the OK key 4123 at the coordinates (4, 0) is not touched (S26: No), the CPU 21 returns to and repeats S16.

Next, if the CPU 21 determines that no image-process keys 4121 are touched (S16: No), and if the CPU 21 determines that a thumbnail image 411 has been touched (S18: Yes), the CPU 21 performs the following steps described below.

That is, if the CPU 21 determines that a thumbnail image 411 has been touched (S18: Yes), in S30 the CPU 21 determines whether the touched (selected) thumbnail image 411 represents the result of the image process that is selected most recently.

If the thumbnail image 411 that has been touched does not represent the result of the image process that is selected most recently (S30: No), in S32 the touched thumbnail image 411 is replaced with the thumbnail image 411 that represents the result of the image process, which is selected most recently, performed on the image data corresponding the touched thumbnail image 411. The CPU 21 proceeds to S26. In this case, the result of the image process that is selected most recently is represented by the thumbnail image 411 that is currently selected. When the user wants to confirm a result of the image process with respect to other thumbnail image 411, the user just touch the thumbnail image 411 that he or she want to confirm. Thus, the multifunction peripheral 1 has high operability.

If the CPU 21 determines that the touched thumbnail image 411 represents the result of the image process that is selected most recently (S30: Yes), in S36 the CPU 21 controls the touch panel to replace the touched thumbnail image 411 with a thumbnail image 411 that represents the result of cancellation of the image process that is selected most recently with respect to the image file corresponding to the touched thumbnail image 411. In other words, in S36 the CPU 21 controls the touch panel 41 to replace the most recently touched (selected) thumbnail image 411 in S18 representing the result of the selected image process with a thumbnail image 411 representing the result of the image processes that has been selected in S16 without the image process that is most recently selected in S16, on the image data corresponding to the most recently touched (selected thumbnail image 411). Thus, if only one image process has been selected in S16, the CPU 21 controls the touch panel 41 to replace the most recently touched (selected) thumbnail image 411 with a thumbnail image 411 representing image without performing the selected image process on the image data corresponding to the most recently touched (selected) thumbnail image 411. Then, the CPU 21 proceeds to S26.

Figure 6G:
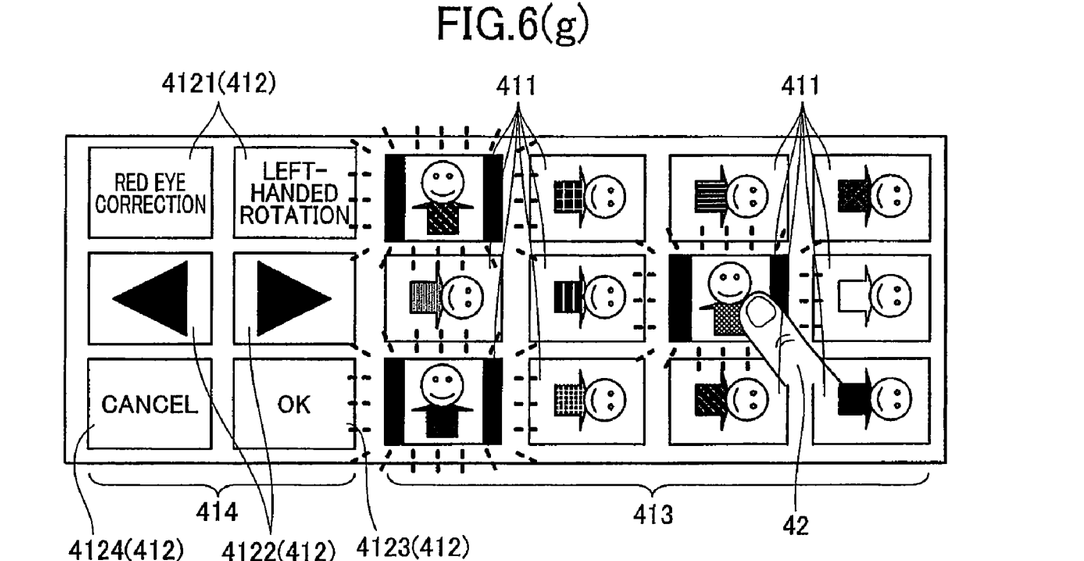
FIG. 6(g) shows a screen of the touch panel showing a thumbnail image being touched by the user.
Figure 6H:
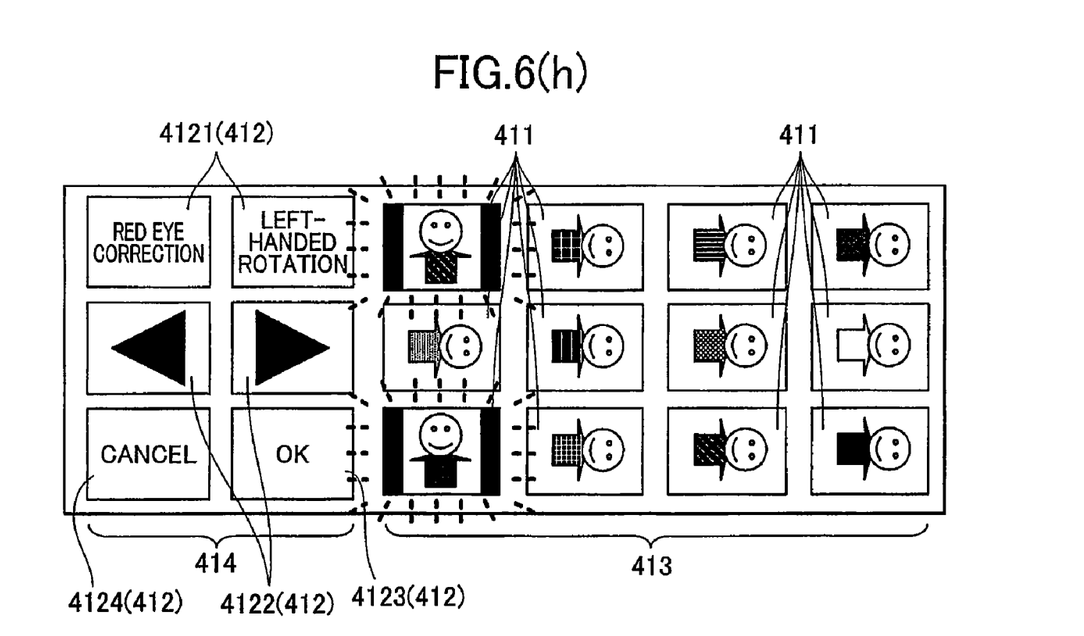
FIG. 6(h) shows a screen of the touch panel showing a thumbnail image replaced from the thumbnail image that has been touched as shown in FIG. 6(g)

FIG. 6(g) is a diagram showing a thumbnail image 411 being touched by the user, the thumbnail image 411 representing the result of the image process that has been selected most recently. FIG. 6(h) is a diagram showing a replaced thumbnail image 411 from the thumbnail image 411 that has been touched in FIG. 6(g).

As shown in FIG. 6(g), every time an image process is selected, all thumbnail images are substituted at a time by thumbnail images, each representing the result of the image process that is selected most recently. Seeing the thumbnail images representing the result of the selected image process, the user may think that some thumbnail images need not be so processed. In this case, as shown in FIG. 6(g), the user touches the given thumbnail images 411 representing the result of the selected image process. Then, the thumbnail images 411 change back to the thumbnail image representing the state before representing the result of the image process. In other words, even if the thumbnail image 411 represents a result of the plurality of image processes that have been selected, the user can cancel the intended image process from among the plurality of image processes. Accordingly, the user can visually confirm the thumbnail image 411 that represents a result of desired image process performed on the image data corresponding to the thumbnail image 411.

Referring to FIG. 5 again, the thumbnail-image displaying process will be further explained. If the CPU 21 determines that the OK key 4123 at the coordinates (4, 0) is touched (S26: Yes), in S39 the CPU 21 stores, in the determined image process storage area 234 (see FIG. 4(*a*)), the image process whose results is presented by each thumbnail image 411, as attribute information about the image file corresponding the each thumbnail image 411. That is, the image process whose results are represented by the thumbnail image 411 when the user touches the OK key 4123 is regarded as a determined image process that the user has determined to perform, and the data about this image process is stored as attribute information about the image file.

In the multifunction peripheral 1 according to the embodiment, each image file stored in the image file temporary storage area 230 is processed in accordance with the attribute information stored in the determined image process storage area 234. How the image file is processed is not explained here in detail.

Next, in S40 the CPU21 controls the touch panel 41 to delete the image-process keys 4121, cursor keys 4122, OK key 4123 and cancel key 4124, all displayed in the operation-key display region 414 and to display a message thereon instead, asking the user whether the process should be proceeded further.

FIG. 7(*a*) is a diagram showing the screen of the touch panel 41 after the user selects image processes and touches the OK key 4123. As shown in FIG. 7(*a*), a question of "Do you proceed with the process?" and two keys "Yes" and "No" are displayed in the operation-key display region 414. The user may touch the "Yes" key or the "No" key, to answer the question.

Referring to FIG. 5 again, the thumbnail-image displaying process will be further explained. In S42 the CPU 21 determines whether the "Yes" key has been touched. If the CPU 21 determines that the "Yes" key has been touched (S42: Yes), the CPU 21 returns to and repeats S2.

In repeating S2, thumbnail images representing the result of the image process that is stored in the determined image process storage area 234 as attribute information are displayed. Seeing these images, the user can determines whether another process to be performed should be added in addition to the image process by touching the OK key 4123.

As described above, thumbnail images 411, each showing the result of the cancellation of the image process that is selected, are displayed in S28. If any image process stored as attribute information in the determined image process storage area 234 is selected, however, S28 is skipped. That is, if the CPU 21 determines that the thumbnail image 411 representing the result of the selected image process is displayed on the touch panel 41 (S20: Yes), and if the selected image process is stored in the determined image process storage area 234, the CPU 21 does not replace the thumbnail image 411. This prevents unintended cancellation of any image process that has been already set. The operability of the multifunction peripheral 1 therefore becomes high.

With the multifunction peripheral 1 according to this embodiment, even if the user selects a plurality of thumbnail images 411, the user can see the result of any image process he or she has selected for the selected thumbnail images 411, in the form of a table (list), merely by touching the thumbnail images. The thumbnail images 411 other than those selected is maintained, that is, displayed without changing at all. The user can totally clearly understand that the influence of the selected image process imposes on the selected image files, by comparing the selected thumbnail images 411 with the non-selected thumbnail images 411.

While the invention has been described in detail with reference to the above embodiments thereof, it would be apparent to those skilled in the art that various changes and modifications may be made therein without departing from the spirit of the invention.

For example, the invention is not limited to the multifunction peripheral 1 having the touch panel 41 that can detect, as described above, the touching (contact) of a pointer. The invention can be applied also to a multifunction peripheral that a pointer touch panel having a touch panel that can detect the approaching of a pointer toward the touch panel.

In the embodiment described above, the image file stored in the memory card can be read into the image file temporary storage area 230 (see FIG. 2), and the touch panel 41 can display the thumbnail image 411 of the image file. The invention is not limited to this configuration. The invention can be well applied to, for example, a multifunction peripheral in which thumbnail image data is generated from the image data read by the scanner 3, or the image data received from PC, and the touch panel 41 displays the thumbnail images represented by the thumbnail data.

In the embodiment described above, if the thumbnail image 411 representing the selected image process has already displayed on the touch panel 41 (S20: Yes), the thumbnail image 411 is substituted by a thumbnail image 411 representing the result of canceling the image process, regardless a type of the image process that has been selected. Alternatively, the thumbnail image representing the result of the image process 411 may be substituted by a thumbnail image 411 that represents a result of image process repeatedly performed on the image data for some type of the image process. For example, if the image process selected is left-handed rotation or right-handed rotation, and if the thumbnail image 411 representing the selected image process has already displayed on the touch panel 41 (S20: Yes), the thumbnail image now displayed may be substituted by a thumbnail image that is further rotated.

In the thumbnail-image displaying process (see FIG. 5) performed in the embodiment described above, if the touched thumbnail image 411 determined not to be one that represents the result of the image process selected most recently (S30: No), in S32 the CPU 21 controls the touch panel 41 to replace this thumbnail image 411 with a thumbnail image 411 that represents the result of the image process selected most recently. Alternatively, the thumbnail image 411 may be substituted by a thumbnail image that represents the results of all image processes that has been selected before.

In the thumbnail-image displaying process (see FIG. 4(*b*)) performed in the embodiment described above, thumbnail images 411 and the image-process keys 4121 are displayed simultaneously as illustrated in FIG. 6(*a*). Alternatively, the image-process keys 4121 may not be displayed in Steps S2 to S10, in which the user can select any thumbnail image displayed.

Figure 7B:
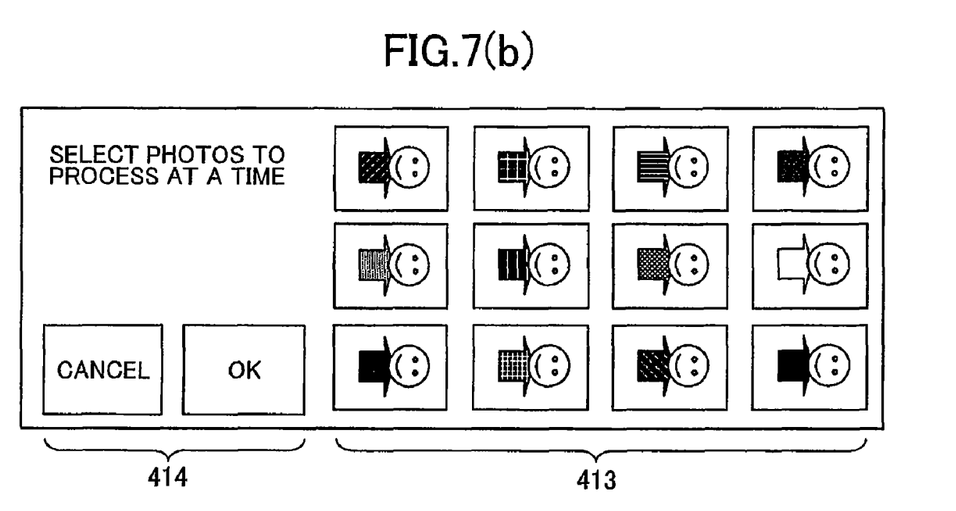
FIG. 7(b) is a diagram showing a screen of the touch panel in Step S2 of a thumbnail-image displaying process according to a modification of the embodiment.

FIG. 7(*b*) is a diagram showing a screen on the touch panel 41 in Step S2 of the thumbnail-image displaying process according to this modification that does not display the image-process keys 4121. That is, FIG. 7(*b*) corresponds to FIG. 6(*a*) of the embodiment. As shown in FIG. 7(*b*), no image-process keys 4121 are displayed on the operation-key display 414, thereby providing a vacant space on the operation-key display region 414. In the vacant space, a message and operation keys 412 may be displayed as shown in FIG. 7(*b*). The message is, for example, "Select photos to process at a time," which prompts the user to select the thumbnail images 411 showing the photos that should be processed at a time.

Subsequently, when the user selects thumbnail images 411 and then touches the OK key 4123, the message is deleted from the operation-key display region 414, and image-process keys 4121 and cursor keys 4122 are displayed instead as shown (see FIG. 6(*e*)). As shown in FIG. 6(*e*), the thumbnail images 411 remain displayed, and the thumbnail images 411 selected remain highlighted. The user can select any image process desired, while visually confirming all thumbnail images 411 displayed. Thus, the user can select appropriate image processes.

What is claimed is:

1. An image processing apparatus comprising:
   a position detecting unit that detects an indicated position on a display unit;
   a retrieving unit that retrieves a plurality of sets of image data;
   a thumbnail display control unit that controls a plurality of thumbnail images representing contents of the plurality of sets of image data to be displayed on the display unit;
   a determining unit that repeatedly determines whether an indicated position detected by the position detecting unit corresponds to an image displayed on the display unit;
   a thumbnail designating unit that designates a plurality of designated thumbnail images from among the plurality of thumbnail images based on a plurality of determinations made by the determining unit;
   a process display control unit that controls a plurality of process-indicating images to be displayed on the display unit together with the plurality of thumbnail images, the plurality of process-indicating images corresponding to a plurality of candidate processes to be performed on at least one set of image data;
   a process designating unit that designates a process from among the plurality of candidate processes based on a determination made by the determining unit after the thumbnail designating unit designates the plurality of designated thumbnail images; and
   a changing unit that changes, after the process designating unit designates the process, the plurality of designated thumbnail images that are designated by the thumbnail designating unit to a plurality of processed thumbnail images that represent results of the designated process performed on sets of image data corresponding to the plurality of designated thumbnail images designated by the thumbnail designating unit while maintaining to display the thumbnail image other than the plurality of designated thumbnail images designated by the thumbnail designating unit,
   wherein after the changing unit changes the plurality of designated thumbnail images to the plurality of processed thumbnail images, the thumbnail designating unit designates the plurality of processed thumbnail images as a substitution for the plurality of designated thumbnail images,
   wherein the process designating unit newly designates a process from among the plurality of candidate processes based on a determination by the determining unit while the thumbnail designating unit designates the plurality of processed thumbnail images, the newly designated process being different from the process previously designated by the process designating unit,
   wherein after the process designating unit newly designates the process, the changing unit changes the plurality of processed thumbnail images designated by the thumbnail designating unit to a plurality of processed thumbnail images that represent results of the newly designated process performed on sets of image data corresponding to the plurality of processed thumbnail images designated by the thumbnail designating unit while maintaining to display the thumbnail image other than the plurality of processed thumbnail images designated by the thumbnail designating unit.

2. The image processing apparatus as claimed in claim 1, further comprising a first canceling unit that changes the plurality of processed thumbnail images to a plurality of thumbnail images that represent results of canceling the process with respect to the sets of image data corresponding to the plurality of processed thumbnail images when the process designating unit designates the image corresponding to a candidate image process of which the plurality of processed thumbnail images represent the results.

3. The image processing apparatus as claimed in claim 1, further comprising:
   a processed thumbnail determining unit that determines whether a newly designated thumbnail image is a processed thumbnail image of the plurality of processed thumbnail images;
   a second canceling unit that changes the processed thumbnail image to a thumbnail image that represents a result of canceling a designated image process with respect to image data corresponding to the newly designated thumbnail image when the processed thumbnail image determining unit determines that the newly designated thumbnail image is the processed thumbnail image,
   wherein when the thumbnail determining unit determines that the newly designated thumbnail image is not one of the plurality of processed thumbnail images, the changing unit changes the newly designated thumbnail image to a processed thumbnail image that represents a result of the designated image process performed on a set of image data corresponding to the newly designated thumbnail image.

4. The image processing apparatus as claimed in claim 3, wherein after the changing unit changes a plurality of designated thumbnail images to a plurality of processed thumbnail images in several times, the second canceling unit changes the processed thumbnail image to a thumbnail image that represents a result of canceling a designated process that is most recently designated with respect to image data corresponding to the newly designated thumbnail image.

5. The image processing apparatus as claimed in claim 1, wherein when the thumbnail determining unit determines that a newly designated thumbnail image is not one of the plurality of processed thumbnail images, the changing unit changes the newly designated thumbnail image to a processed thumbnail image that represents a result of the designated image process performed on a set of image data corresponding to the newly designated thumbnail image.

6. The image processing apparatus as claimed in claim 1, wherein the thumbnail display control unit displays the plurality of designated thumbnail images in a style different from a thumbnail image other than the plurality of designated thumbnail images.

7. The image processing apparatus according to claim 1, wherein the position detecting unit is a touch panel that detects the indicated position thereon, wherein the thumbnail display control unit controls the plurality of thumbnail images representing the contents of the plurality of sets of image data to be displayed on the touch panel, wherein the determining unit determines repeatedly whether the indicated position detected by the touch panel corresponds to the image displayed on the touch panel, wherein the process display control unit that controls the plurality of process-indicating images to be displayed on the touch panel together with the thumbnail image.

8. The image processing apparatus as claimed in claim 1, further comprising:

a designated thumbnail determining unit that determines whether the thumbnail designating unit designates one of the plurality of processed thumbnail images based on a determination made by the determining unit, while the thumbnail designating unit designates the plurality of processed thumbnail images; and a third canceling unit that changes, when the thumbnail designating unit designates one of the plurality processed thumbnail images, the designated one of the plurality of processed thumbnail images to a thumbnail image that represents a result of canceling the image process with respect to image data corresponding to the designated one of the plurality of processed thumbnail images while maintaining to display the plurality of processed thumbnail images other than the designated one of the plurality of processed thumbnail images.

9. An image processing method:
a) detecting an indicated position on a display unit;
b) retrieving a plurality of sets of image data;
c) controlling a plurality of thumbnail images representing contents of the plurality of sets of image data to be displayed on the display unit;
d) determining repeatedly whether an indicated position corresponds to an image displayed on the display unit;
e) designating a plurality of designated thumbnail images from among the plurality of thumbnail images based on a plurality of determinations made by the determining step d);
f) controlling a plurality of process-indicating images to be displayed on the display unit together with the plurality of thumbnail images, the plurality of process-indicating images corresponding to a plurality of candidate processes to be performed on at least one set of image data;
g) designating a process from among the plurality of candidate processes based on a determination made by the determining step d) after the designating step e) designates the plurality of designated thumbnail images; and
h) changing, after the designating step g) designates the process, the plurality of thumbnail images that are designated in the designating step e) to a plurality of processed thumbnail images that represent results of the designated process performed on sets of image data corresponding to the plurality of designated thumbnail images designated in the designating step e) while maintaining to display the thumbnail image other than the plurality of designated thumbnail images designated in the designating step e), wherein after the changing step h) changes the plurality of designated thumbnail images to the plurality of processed thumbnail images, the designating step e) designates the plurality of processed thumbnail images as a substitution for the plurality of designated thumbnail images, wherein the designating step g) newly designates a process from among the plurality of candidate processes based on a determination made by the determining step d) from among the plurality of candidate processes while the plurality of processed thumbnail images are designated, the newly designated process being different from the process previously designated by the designating step g), wherein after the designating step g) newly designates the process, the changing step h) changes the plurality of processed thumbnail images designated by the designating step e) to a plurality of processed thumbnail images that represent results of the newly designated process performed on sets of image data corresponding to the plurality of processed thumbnail images designated by the designating step e) while maintaining to display the thumbnail image other than the plurality of processed thumbnail images designated by the designating step e).

10. A non-transitory, computer-readable storage medium storing a set of computer-readable instructions for a processor, the computer-readable instructions instructing the processor to perform the steps of:
a) detecting an indicated position on a display unit;
b) retrieving a plurality of sets of image data;
c) controlling a plurality of thumbnail images representing contents of the plurality of sets of image data to be displayed on the display unit;
d) determining repeatedly whether an indicated position corresponds to an image of the plurality of images displayed on the display unit;
e) designating a plurality of designated thumbnail images among the plurality of thumbnail images based on a plurality of determinations made by the determining instruction d);
f) controlling a plurality of process-indicating images to be displayed on the display unit together with the thumbnail image, the plurality of process-indicating images corresponding to a plurality of candidate processes to be performed on at least one set of image data;
g) designating a process from among the plurality of candidate processes based on a determination made by the determining instruction d) after the designating instruction e) designates the plurality of designated thumbnail images; and
h) changing, after the designating instruction g) designates the process, the plurality of thumbnail images that are designated in the designating instruction e) to a plurality of processed thumbnail images that represent results of the designated process performed on sets of image data corresponding to the plurality of designated thumbnail images designated in the designating instruction e) while maintaining to display the thumbnail image other than the plurality of designated thumbnail images designated in the designating instruction e), wherein after the changing instruction h) changes the plurality of designated thumbnail images to the plurality of processed thumbnail images, the designating instruction e) designates the plurality of processed thumbnail images as substitution of the plurality of designated thumbnail images, wherein the designating instruction g) newly designates a process from among the plurality of candidate processes based on a determination made by the determining instruction d) from among the plurality of candidate processes while the plurality of processed thumbnail images is designated, the newly designated process being different from the process previously designated by the designating step g), wherein after the designating instruction g) newly designates the process, the changing instruction h) changes the plurality of processed thumbnail images designated by the designating instruction e) to a plurality of processed thumbnail images that represent results of the newly designated process performed on sets of image data corresponding to the plurality of processed thumbnail images designated by the designating instruction e) while maintaining to display the thumbnail image other than the plurality of processed thumbnail images designated by the designating instruction e).

* * * * *